US011223753B2

(12) United States Patent
Waldl

(10) Patent No.: US 11,223,753 B2
(45) Date of Patent: Jan. 11, 2022

(54) CAMERA FOR INDUSTRIAL IMAGE PROCESSING

(71) Applicant: B&R INDUSTRIAL AUTOMATION GMBH, Eggelsberg (AT)

(72) Inventor: Andreas Waldl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/707,517

(22) Filed: Sep. 18, 2017

(65) Prior Publication Data

US 2018/0084168 A1 Mar. 22, 2018

(30) Foreign Application Priority Data

Sep. 19, 2016 (AT) .............................. A 50838/2016

(51) Int. Cl.
*H04N 5/225* (2006.01)
*H04N 5/232* (2006.01)
(Continued)

(52) U.S. Cl.
CPC ........... *H04N 5/2254* (2013.01); *G03B 17/02* (2013.01); *G03B 17/14* (2013.01); *H04B 5/0031* (2013.01);
(Continued)

(58) Field of Classification Search
CPC ............. H04N 5/2254; H04N 5/23209; H04N 5/23241; H04B 5/0031; G03B 3/00;
(Continued)

(56) References Cited

U.S. PATENT DOCUMENTS 5,194,956 A * 3/1993 Iwamoto ............ H04N 5/23209
348/347
5,630,180 A 5/1997 Kusaka
(Continued)

FOREIGN PATENT DOCUMENTS

DE  10 2012 111 231    5/2015
DE  10 2015 106 844   11/2015
(Continued)

OTHER PUBLICATIONS

Korea Search Report issued in counterpart Austria Appln. No. A50838/2016 (dated Jul. 16, 2017).
(Continued)

*Primary Examiner* — Luong T Nguyen
(74) *Attorney, Agent, or Firm* — Greenblum & Bernstein, P.L.C.

(57) ABSTRACT

A camera for industrial image processing having a camera module and an objective module that is releasably connected thereto and has an optical system having at least one optical lens preferably comprises—in the camera module—an image sensor for capturing an image and a camera control unit for controlling the camera module and/or the objective module, and—in the objective module—a storage unit having lens data, wherein interacting wireless near field communication units are provided in the camera module and in the objective module, wherein the near field communication unit in the objective module converts an electromagnetic alternating field emitted from the near field communication unit in the camera module into electrical energy for supplying energy to the objective module, and the camera module reads the lens data out via the near field communication units, and the camera control unit controls therewith a function of the camera module and/or of the objective module.

32 Claims, 2 Drawing Sheets

(51) Int. Cl.
*G03B 17/14* (2021.01)
*G03B 17/02* (2021.01)
*H04B 5/00* (2006.01)
*G02B 7/02* (2021.01)
*G02B 3/14* (2006.01)

(52) U.S. Cl.
CPC ..... *H04N 5/23209* (2013.01); *H04N 5/23241* (2013.01); *G02B 3/14* (2013.01); *G02B 7/028* (2013.01); *G03B 2206/00* (2013.01)

(58) Field of Classification Search
CPC ........ G03B 17/00; G03B 19/00; G03B 17/14; G03B 17/02; G03B 2206/00; G06K 7/10; G02B 7/028; G02B 3/14; G02B 7/04
See application file for complete search history.

(56) References Cited

U.S. PATENT DOCUMENTS

| | | | |
|---|---|---|---|
| 6,172,709 B1 | 1/2001 | Yamano et al. | |
| 8,712,394 B2* | 4/2014 | Bos | H04W 4/50 |
| | | | 455/418 |
| 8,947,590 B2 | 2/2015 | Nunnink | |
| 9,083,885 B1 | 7/2015 | Chen et al. | |
| 9,344,650 B2* | 5/2016 | Winterot | H04N 5/23296 |
| 9,729,773 B2* | 8/2017 | Imamura | H04N 5/23209 |
| 10,225,026 B2* | 3/2019 | Lee | F02F 3/00 |
| 2007/0098385 A1 | 5/2007 | Tanaka et al. | |
| 2007/0147815 A1* | 6/2007 | Tanaka | G03B 17/14 |
| | | | 396/56 |
| 2007/0268371 A1* | 11/2007 | Misawa | H04N 5/2252 |
| | | | 348/207.99 |
| 2008/0240709 A1 | 10/2008 | Nakamura et al. | |
| 2008/0267601 A1* | 10/2008 | Kobayashi | G03B 13/32 |
| | | | 396/91 |
| 2012/0133813 A1* | 5/2012 | Nagano | H04N 5/23212 |
| | | | 348/311 |
| 2013/0010373 A1* | 1/2013 | Abe | G02B 7/102 |
| | | | 359/698 |
| 2014/0320736 A1* | 10/2014 | Tomita | G03B 13/36 |
| | | | 348/353 |
| 2015/0077593 A1 | 3/2015 | Ito et al. | |
| 2015/0124336 A1* | 5/2015 | Kaufman | G01J 3/0205 |
| | | | 359/728 |
| 2015/0323709 A1 | 11/2015 | Nunnink | |
| 2015/0347534 A1* | 12/2015 | Gross | H04L 51/046 |
| | | | 707/722 |
| 2016/0188925 A1* | 6/2016 | Liu | G06K 19/073 |
| | | | 340/10.34 |
| 2016/0227083 A1* | 8/2016 | Imamura | G03B 17/14 |
| 2016/0323428 A1* | 11/2016 | Kim | H04M 1/72412 |
| 2017/0029327 A1* | 2/2017 | Jones | C30B 29/20 |
| 2017/0373766 A1* | 12/2017 | Lee | G08C 17/00 |

FOREIGN PATENT DOCUMENTS

| | | |
|---|---|---|
| KR | 20130061395 | 6/2013 |
| WO | 02/50757 | 6/2002 |
| WO | 2010/081060 | 7/2010 |

OTHER PUBLICATIONS

European Search Report/Office Action conducted in counterpart Europe Appln. No. 17191613.3 (dated Jan. 23, 2018) (w/ machine translation).

\* cited by examiner

CAMERA FOR INDUSTRIAL IMAGE PROCESSING

CROSS-REFERENCE TO RELATED APPLICATIONS

The present application claims priority under 35 U.S.C. § 119(a) of Austria Patent Application No. A50838/2016 filed Sep. 19, 2016, the disclosure of which is expressly incorporated by reference herein in its entirety.

BACKGROUND OF THE INVENTION

1. Field of the Invention

The present invention relates to a camera for industrial image processing, having a camera module and an objective module releasably connected thereto, with an optical system having at least one optical lens, and to a method for operating such a camera for industrial image processing.

2. Discussion of Background Information

In industrial image processing, for example, for machine vision applications, it is common to use camera systems which have a camera module having an image sensor and an objective module (also simply called an objective) having a lens assembly (at least one optical lens) that are configured so as to be mechanically separated and releasable from one another. This makes it possible to use a camera module with a variety of interchangeable objectives. The mechanical connection between the camera module and the objective module is then usually performed with standardized objective mounts, such as, for example, a known S-mount, C-mount, or CS-mount. The difference between these mounts lies, in addition to the different optical performance data thereof, substantially in the installation size. An S-mount uses an M12 thread, whereas a C- or CS-mount uses a 1" thread having a pitch of $\frac{1}{32}$". Another difference is the flange focal distance, i.e., the predetermined distance between the image plane of the image sensor and the fastening surface of the objective. DE 10 2012 111 231 A1 and WO 2010/081060 A1 illustrate, for example, a camera for industrial image processing with which a variety of objectives, even with different mount systems, can be mounted. This does make it possible or easier to switch between different mount systems, it being only incumbent on the user to ensure that all of the changes associated with switching the objective module are considered and implemented, which may be quite complicated and tedious. A different objective module, even if the focal length and aperture are identical, may necessitate changing the program settings of downstream image processing or camera parameters in the camera system, due to, for example, different optical properties. Another problem connected thereto is that an objective module may be easily mistaken by the user, possibly resulting in malfunctions of the machine vision system.

In many applications of industrial image processing, an objective having a fixed focus or manually adjustable focus is used. With the manually adjustable variant, the objective, or the lens in the objective, is displaced relative to the image sensor in the camera module by a specific mechanism, for example, via a rotatable adjusting ring. Such objectives are also disclosed in DE 10 2012 111 231 A1 and WO 2010/ 081060 A1. Also known are solutions with which the objective is displaced relative to the image sensor by screwing or unscrewing the mount thread into the camera module, or by adjusting by means of a thread separation in the objective, which also amounts to focus adjustment. The position of the objective is then fixed, for example, by means of a lock nut or a blind set screw, in order to fix the focus setting. Other known objectives have a motorized focus adjustment, such as in, for example, U.S. Pat. No. 6,172,709 B1. Due to the small size of objectives that is especially sought after for industrial image processing, however, these solutions are very costly. There is also the fact that these would not be suitable for frequent focus adjustment—such as would be necessary, for example, with autofocus in many applications of industrial image processing with, typically, several thousand images per minute—due to the adjustment speeds required and the short service lives. Another problem with motorized focus adjustment is the electrical energy supply necessary therefor, which is generally implemented via the camera module and electrical contacts.

There are also known objectives for industrial image processing that use liquid lenses that enable automatic focus adjustment, also as autofocus. The problem with liquid lenses is primarily the required electrical energy supply for the liquid lenses and the electronics for controlling the liquid lens. The electrical energy supply and the control are performed in most cases via the camera module, via electrical contacts between the camera module and the objective module for the energy supply and the control. Examples thereof are also disclosed in DE 10 2012 111 231 A1 or WO 2010/081060 A1. In these examples the electrical contact with the camera module is prepared afterwards, for example, in the case of a connection cable that is plugged into provided sockets after the objective has been connected to the camera module. Both, however, necessitate corresponding provisions, such as contacts, plugs, sockets, cables, and the like, making the camera system more complex and more error-prone. It is even common to make a plurality of provisions at the same time, due to the absence of any standardized mount, on account of the large number of mounting methods for contacting liquid lenses, even with different objective modules from the same manufacturer. Electrical contacts do, however, also have the disadvantage, especially in the field of industrial image processing, that they are prone to fouling of accessible contacts in the industrial environment. This remains a problem even when plugs and sockets are used, such as is described, for example, in DE 10 2012 111 231 A1.

Cameras from the consumer goods sector, such as conventional photo or video cameras, generally have objectives with auto focus adjustment, wherein the electrical energy is also provides via electrical contacts between the camera module and the objective. These objectives are generally of very complex construction, are expensive and generally also take up a much larger space due to other connections. The number of images taken within a typical life cycle with such cameras is also much lower than with applications in industrial image processing, which allows for mechanical solutions for focus adjustment. The above problems therefore do not occur with such cameras. In this area, however, it is usually such that each manufacturer has defined their own mount, and these are not compatible with one another. Cameras from the consumer goods sector are also unsuitable for industrial image processing, because such cameras are not available in variants suitable for industrial applications. This means that they neither meet the requirements for environmental conditions (temperature, vibrations, tightness requirements, etc.), nor possess, apart from the standardized stand thread, suitable options for mechanical mounting onto a machine or an industrial interface to communicate with a control device or an external peripheral. These cameras often have neither an interface for raw image transmission to an external image evaluation unit, nor offer the option of internal image processing on the camera for applications in industrial image processing. In addition, such cameras also generally offer no possibility for triggering or synchronizing within the microsecond range, commonly required for industrial applications. For these reasons, such cameras from the consumer goods sector are virtually unusable in the field of industrial image processing.

U.S. Pat. No. 5,630,180 A also discloses a camera from the consumer goods sector that has an interchangeable objective. In the interchangeable objective, a storage unit stores lens data that can be read out from the camera and is used in the camera to correct the optical properties of the objective. The connection between the interchangeable objective and the camera is made, once again, via electrical contacts having all of the aforementioned disadvantages.

Corrections for the changes of an optical system over time may, however, also be performed without saved lens data, such as is disclosed in, for example, DE 10 2015 106 844 A1 for an industrial image processing system having an interchangeable lens assembly. The interchangeable lens assembly comprises, in particular, a variable lens and a collecting lens assembly. The optical drift of a vision system that occurs over time is compensated for with the variable lens. The electrical connection between the lens assembly and the camera module takes place via electrical contacts, yet again with all of the aforementioned disadvantages.

SUMMARY OF THE EMBODIMENTS

The present invention addresses the problem of setting forth a camera for industrial image processing and a related method for operating a camera for industrial image processing that does not have the aforementioned disadvantages of the prior art.

This problem is solved according to the invention by providing, in the camera module, an image sensor for capturing an image and a camera control unit for controlling the camera module and/or the objective module, by providing a storage unit that has lens data in the objective module, and by also providing interacting wireless near field communication units in the camera module and in the objective module, wherein the near field communication unit in the objective module converts electromagnetic waves emitted from the near field communication unit in the camera module into electrical energy for supplying energy to the objective module, the camera module reads out the lens data via the near field communication units, and the camera control unit controls therewith a function of the camera module and/or the objective module. The problem is also solved with a method in which, in the objective module, a storage unit stores lens data that is read out from the camera module via interacting near field communication units in the objective module and camera module and is used in a camera control unit in the camera module, in order to capture an image with the camera, and electrical energy for supplying energy to the objective module is obtained from the electromagnetic alternating field emitted from the near field communication unit in the camera module.

These measures make it possible to overcome all of the disadvantages associated with electrical contacts on the camera module and objective module. Because both the energy supply and the data communication between the objective module and the camera module are transmitted via near field communication, i.e., wirelessly, there is no need at all for the objective module and camera module to have therebetween any electrical contacts that can be damaged, for example, when the objective is being switched and/or due to environmental influences. The storage unit in the objective module additionally makes it possible to save lens data that can be used to control a function of the objective module and/or of the camera module.

The lens data may also, however, include data that makes it possible to uniquely identify the objective module, so that mistaken use of objective modules can be practically eliminated or can be identified and indicated. It would also be possible to use, as lens data, data of the optical system of the objective module that makes it possible to set, even automatically, camera parameters or program settings in the camera module that are required in order to capture an image. Last but not least, correction data making it possible to compensate for aberrations in the optical system may also be used as the lens data. The storage unit of the objective module may, however, also store operating data that would be interesting for servicing. For example data on the maximum ambient temperature, shock or vibration, or the operating time, are valuable information that the objective module can store in the storage unit, either independently or via the camera module.

If the camera module also controls a function of the objective module, then it is advantageous when the camera module sends control data for controlling the objective module via the near field communication unit to the objective module. Thus, no electrical contacts are required for this data transfer, either.

It is also especially advantageous when electrical energy for supplying energy to a variable-focus optical lens, e.g., a liquid lens, in the objective module is obtained from electromagnetic waves emitted from the near field communication unit in the camera module. The objective module therefore does not require any own energy supply, thus simplifying, in particular, the handling of the objective modules as well.

With a sensor in the objective module, as well, it is very especially advantageous to detect a physical quantity in the vicinity of the objective module and use the physical quantity to control a function of the objective module and/or of the camera module. It is also advantageous when the physical quantity is used to correct a dependence of the optical properties of the objective module on this physical quantity. With one of these measures, the camera is capable of automatically adapting itself to different installation locations and different environmental conditions, whereby the quality of image capturing can be improved.

To correct the dependence, it would be possible to simply save correction data, which can easily be read out via the near field communication, as the lens data.

Due to the desired compactness, cameras for industrial image processing offer little installation space, e.g., because the camera module and the objective module are releasably connected to one another via a standardized C-mount, CS-mount, or S-mount connection. In order to nevertheless be able to accommodate the required antennas for the near field communication, it is advantageous when there is provided, on the objective module, a lens flange that surrounds the optical system of the objective module and abuts against an abutment surface on the camera module, wherein an antenna arrangement of the near field communication unit of the objective module is arranged on the lens flange and an antenna arrangement of the near field communication unit of the camera module is arranged on the abutment surface. To this end, it is beneficial when the antenna arrangement on the objective module is arranged in a depression of the lens flange, and/or the antenna arrangement on the abutment surface is arranged in a depression of the abutment surface. Thus, compliance with the flange focal distance of the optics can be easily ensured, and yet a sufficiently large surface for the energy transfer can also be made available. In configurations with lower energy requirements, for example, when no actuators and/or no or only a few sensors need to be supplied, a rod antenna may also suffice in order to make the required energy available.

BRIEF DESCRIPTION OF THE DRAWINGS

The present invention shall be described in further detail hereinbelow with reference to FIG. 1 to 3, which illustrate advantageous embodiments of the present invention by way of example, in a schematic and non-limiting manner. In the drawings.

DETAILED DESCRIPTION OF THE EMBODIMENTS

Figure 1:
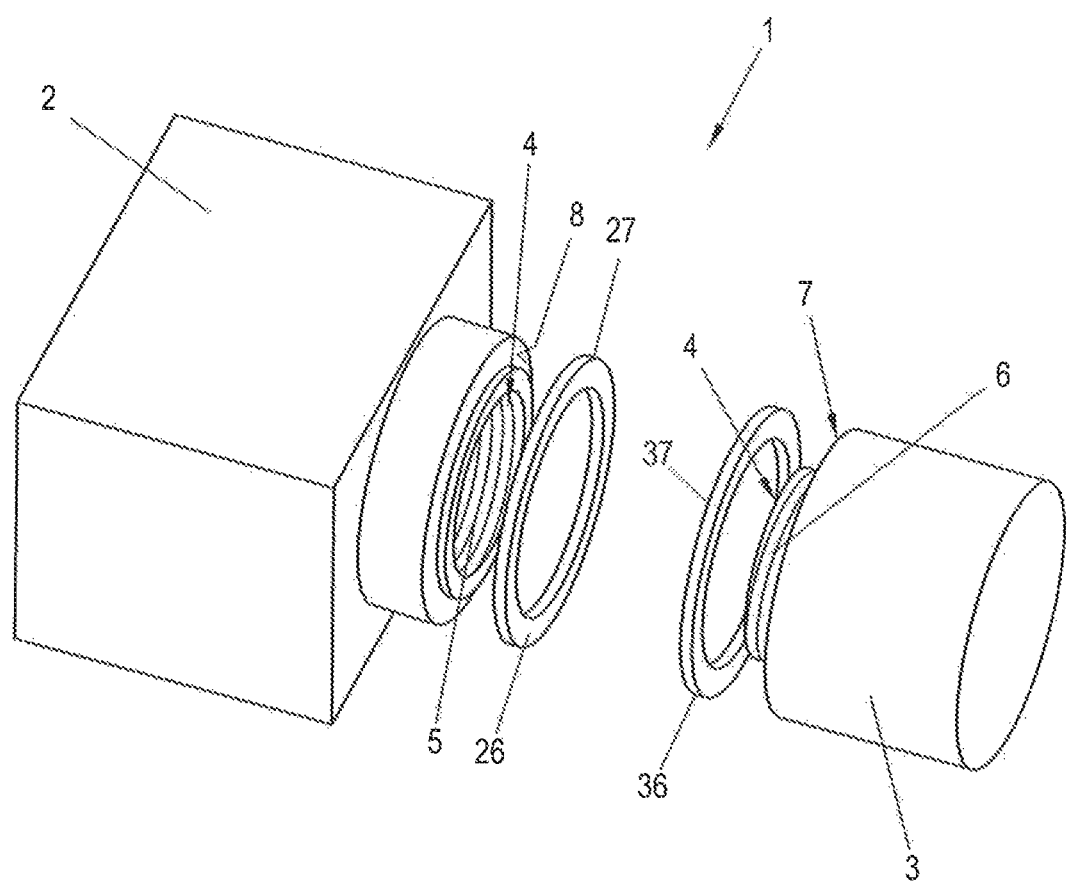
FIG. 1 illustrates a camera module and an objective module of a camera for industrial image processing according to the invention.

FIG. 1 illustrates (in an exploded view) a camera 1 for industrial image processing according to the invention, which comprises a camera module 2 and an objective module 3. The camera module 2 and the objective module 3 are releasably connected via a standardized mount 4, e.g., a C-mount or S-mount. The mount 4 is composed, for example, of an internal thread 5 on the camera module 2 and a corresponding external thread 6 on the objective module 3, which is screwed into the internal thread 5 of the camera module 2. In the objective module 3, or in the housing of the objective module 3, there is provided (see FIG. 2) an optical lens, e.g., a lens having a fixed focus or a variable-focus lens 31, such as for example a liquid lens, or even a lens system composed of a plurality of lenses (or a mixture of lenses having fixed and variable focus). An image sensor 21 for digitally capturing an image is arranged in the camera module 2, or in the housing of the camera module 2. There are no electrical contacts between the camera module 2 and the objective module 3, neither for electrical energy supply nor for a control connection.

An objective control unit 32 for controlling the variable-focus lens 31, such as the liquid lens, is optionally arranged in the objective module 3. The objective control unit 32 is used to adjust the variable-focus lens and thus to adjust the focus of the camera 1. With a lens that has fixed focus, the objective control unit 32 may be omitted under circumstances, or the objective control unit 32 need not have this functionality.

There are a variety of known configurations for a liquid lens. One known variant uses two isodense liquids, e.g. oil and water, that form a liquid-liquid interface in the lens. Applying different electrical voltages to the lens makes it possible to alter the curvature of this liquid-liquid interface, which, in turn, leads to a change in the focal length. Another known liquid lens uses a movable membrane that covers a liquid reservoir in order to vary the lens focus. The shape of the membrane is altered by means of a coil, through the application of an electrical current, in order to vary the lens focus. The focus of the liquid lens is therefore adjusted through the application of an electrical voltage or an electrical current.

An image processing unit 22 that processes and/or evaluates digital image data captured from the image sensor 21 is arranged in the camera module 2. The result of the processing may be outputted via an interface 23. The interface 23 may be configured, for example, as a connection to a data bus. The image data itself could also be outputted via the interface 23. Suitable image processing software is therefore implemented in the image processing unit 22. In the image processing unit 22, image processing algorithms by means of which a captured image can be pre-processed or edited may be implemented. The step, necessary for a machine vision system, of evaluating the image data, for example, in order to control a machine or installation therewith, then takes place in an external unit, e.g., in a control unit of the machine or installation. This evaluation of the image data may also take place directly in the image processing unit 22, however, for which reason suitable algorithms or application software would then be implemented—in this case, the term "smart camera" is also often used. A smart camera therefore transmits control data to a machine or installation control device in order to control same. A camera control unit 24 that controls the camera 1 and optionally also a function of the objective module 3, e.g. by controlling the focus or an aperture adjustment, is also arranged in the camera module 2.

The objective module 3 also has provided therein a storage unit 33 that stores lens data of the optical system, in the manner of an electronic type plate. This lens data may comprise, in particular, data for uniquely identifying an objective module 3, data about the optical system or the optical lens of the objective module 3, and calibration data of the objective module 3. In the minimum case, a property of the optics or the lens is stored, in particular, the focal length and optionally also the aperture, in the case of an adjustable aperture also the minimum and maximum aperture. Examples of other lens data include a product designation (order number, product number), a serial number, a type designation, approved manufacturers of camera modules, the adjustment range of the focal lengths with a variable-focus lens, a supported image sensor diagonal, the aberrations of optics (e.g., vignetting, distortion, etc.), and correction data for aberration of the optics. Certain lens parameters, such as, for example, the distortion or the marginal drop of illumination (relative illumination), may also be determined and used as lens data.

Operating the objective module 3, in particular, in order to read out the lens data from the storage unit 33 requires electrical energy. Being able to read out the lens data also necessitates data communication between the camera module 2 and the objective module 3. According to the invention, both the energy supply and the data communication take place via near field communication (NFC) between the camera module 2 and the objective module 3. For this purpose, a near field communication unit 25, 35, respectively connected to an associated antenna arrangement 26, 36, is arranged in both the camera module 2 and in the objective module 3. The near field communication can then be implemented as both active/passive and active/active (peer-to-peer). The near field communication unit 35 in the objective module 3 obtains the energy for reading out from the storage unit 33 from the electromagnetic alternating field of the near field communication that is emitted from the camera module 2.

The lens data can thus be read out from the camera module 2 via the near field communication, either directly or via the objective control unit 32. The lens data may then be used in the camera module 2 in order to ensure that only an objective module 3 that is suitable for the camera module 2 is being used. To this end, it is possible to use, for example, the type designation, the focal length and/or the image sensor diagonal. In this manner, errors in the image capture that may occur due to differences even with the identical type of objective module 3 can be avoided. If these differences are known, for example, because they are stored in the storage unit 33, then these differences can be taken into consideration in the image processing in the image processing unit 22, or the image may already have been previously corrected. This prevents slight differences from causing sporadic errors in the industrial image processing, the origin of which are difficult to assign or determine.

Correction data for aberrations of the objective module 3 (i.e., the entire optical system of the objective module 3) are preferably therefore also stored as lens data. The aberrations or correction data are collected, for example, when the objective module 3 is calibrated and are stored, for example, in the form of a calibration table in the storage unit 33. The camera module 2 can read out the correction data, for example, if a new objective module 3 is being fastened onto the camera module 2, and can then correct the captured image data with the correction data, which improves the quality of the image capture.

Electrical energy is also required for operating or adjusting a variable-focus lens 31, such as, for example, the liquid lens, or for adjusting an adjustable aperture 43 in the objective module 3. Control commands to the objective control unit 32 for adjusting the variable-focus lens 31 in order to change the focus and/or for adjusting the aperture may optionally also be exchanged by means of data communication between the camera module 2 and the objective module 3. Both take place via near field communication (NFC) between the camera module 2 and the objective module 3.

The near field communication also requires antennas in the camera module 2 and in the objective module 3. The antenna arrangement 26 of the camera module 2 may be arranged on a camera module abutment surface 8 in the region of the mount 4. Likewise, the antenna arrangement 36 of the objective module 3 may be arranged on an objective module abutment surface 7 in the region of the mount 4. The camera module abutment surface 8 and the objective module abutment surface 7 are then arranged facing one another, so that antenna arrangements 26, 36 arranged thereon are also arranged facing one another. The two antenna arrangements 26, 36 are therein aligned with one another, as a matter of course, and arranged as close as possible to one another, in order to enable favorable inductive coupling for the near field communication and the energy supply. Surfaces on the camera module 2 and objective module 3 that face each other are therefore especially suitable for the installation of the antenna arrangements 26, 36. The antenna arrangements 26, 36 preferably do not alter the optical system of the camera 1, in particular, for example, the flange focal distance of the optics should not be affected. The antenna arrangements 26, 36 are therefore preferably arranged in depressions on the camera module 2 or on the objective module 3, respectively. An antenna arrangement 26, 36 is preferably mounted on a printed circuit board 27, 37 that is inserted into a depression on a surface of the objective module 3 or of the camera module 2. A printed circuit board 27, 37 may also be configured as a flexible printed circuit board, whereby the number of possible arrangements is increased. This makes it possible to arrange the antenna arrangements 26, 36 as close to one another as possible with a predetermined and unmodified mount 4 (thread, flange focal distance). In the illustrated embodiment according to FIG. 2, the antenna arrangements 26, 36 are arranged on annular printed circuit boards 27, 37 and respectively arranged on end surfaces on the camera module 2 and objective module 3 that face one another and abut against one another. The antennas of the antenna arrangements 26, 36 are preferably provided as spiral-shaped conductors on the printed circuit boards 27, 37.

A near field communication unit 25, 35, with the associated antenna arrangement 26, 36, may also be arranged in an own enclosed housing (a so-called transponder inlay 42 or RFID chip), which can then be inserted into a corresponding recess on the camera module 2 or objective module 3. The antenna arrangement 26, 36 of such a transponder inlay 42 reduces then, as a matter of course, to the size of the transponder inlay 42. If a transponder inlay 42 is used in the objective module 3, then, for example, a stub antenna or rod antenna of a corresponding size relative to the transponder inlay is sufficient on the camera module 2. A transponder inlay 42 often also offers an integrated storage unit 33, which may be used to store lens data. In this case, a separate, additional storage unit in the objective module 3 may even be omitted under certain circumstances. It is also, however, conceivable to use both a storage unit in the transponder inlay and an additional storage unit in the objective module 3 as the storage unit 33 in the objective module 3. Examples of such transponder inlays 42 include a NeoTAG® Inlay from Industria Oberländer Ingenieur-GmbH & Co. KG or an RUD-ID-Point® from RUD Ketten Rieger & Dietz GmbH u. Co. KG. Such a transponder inlay 42 offers, first and foremost, the advantage of a very compact size, which makes it especially suitable for use in an objective module 3.

A camera 1 for industrial image processing is preferably configured so as to be robust, for which reason the housing of the camera module 2 and/or objective module 3 is often made of metal. In order to reduce an adverse effect on the near field communication from metallic surfaces, there may also be a shielding, for example, in the form of a ferrite film or a ferrite shell 44, provided between an antenna arrangement 26, 36 and the housing of the camera module 2 or objective module 3.

Other surfaces on the camera module 2 and objective module 3 that face each other are also suitable for installation of the antenna arrangements 26, 36. For example, the antenna arrangements 26, 36 could also be provided in the region of the threads 5, 6 of the mount 4.

The camera control unit 24 of the camera module 2 and the objective control unit 32 of the objective module 3 are therefore able to communicate with one another and exchange data via the near field communication units 25, 35 and the associated antenna arrangements 26, 36. This also makes it possible, in particular, to control a variable-focus lens of the objective module 3 via the camera module 2, or to adjust an adjustable aperture 43 of the objective module 3. Thus, an auto focus function can be implemented even via the camera control unit 24 and the evaluation of the image data in the image processing unit 22.

The electrical energy for operating the objective module 3, in addition to reading out from the storage unit 33, can also be obtained from the near field communication. The energy of the electromagnetic alternating field emitted from the near field communication unit 25 of the camera module 2 via the antenna arrangement 26 can also be converted in the near field communication unit 35 of the objective module 3 into electrical energy (an energy harvesting function of the near field communication) and used to operate the objective module 3. After the objective module 3 requires only very little electrical energy to operate, the electrical energy obtained from the near field communication is sufficient therefor. Thus, the objective module 3 does not require any electrical connection for additional supply of electrical energy. It shall be readily understood that there may also be a transponder inlay 42 used for energy harvesting, if there is a suitably small distance between the associated antenna arrangements 26, 36.

The objective module 3 may also have arranged thereon at least one sensor 38 that detects a physical quantity in the environment of the objective module 3, such as, for example, a temperature or the like.

The sensor 38 may also be read out from the camera module 2 via the near field communication unit 35, and the camera module 2 may use the delivered sensor values to control the camera 1. The reading out from the sensor 38 may take place directly via the near field communication unit 35, or also indirectly via the objective control unit 32 (such as in FIG. 2). For example, an illumination unit of a machine vision system for industrial image processing could be controlled via the detected ambient temperature. It may also be provided that a sensor value is outputted via the interface 23.

An adjustable-focus lens 31, such as, for example, a liquid lens, may have optical properties that are dependent on the temperature, wherein the temperature dependency is generally known, for example, by measurement or manufacturer specification. Temperature-dependent corrections may be performed therewith, e.g., compensation for a possible temperature-dependent change of the optical properties of a variable-focus lens 31. For this purpose, the temperature is preferably measured close to the lens, for example, through a sensor 38, which may be arranged in the objective module 3 close to the lens 31. The temperature dependency could then also be stored in the storage unit 33 as lens data, for example, as a suitable characteristic map. A temperature-dependent correction could then be implemented in the objective module 3, e.g., in the objective control unit 32. If the correction takes place directly in the objective module 3, then there is, as a matter of course, no need to read out the relevant lens data from the camera module 2. Such a temperature-dependent correction could also be implemented in the camera module 2, for example, in the camera control unit 24 with which the optical system is controlled. It is also conceivable to perform the temperature-dependent correction later in the camera module 2 via the image processing in the image processing unit 22, provided that these temperature-dependent errors entail errors that can be corrected through software.

A position sensor 39 that collects, for example, the spatial angle to the normal of the force of gravity may also be provided in the objective module 3. The location of the camera module 2 or objective module 3 in the space can thus be determined, set (even automated), and monitored. The position sensor 39 may also be configured as a gyro sensor, or contain a gyro sensor, in order to be able to also detect an angular acceleration, in addition to a linear acceleration. The position sensor 39 can thus always correctly determine the location in the space, even if the camera 1 is moving, e.g., when mounted on a robot arm. Likewise, position- or acceleration-dependent corrections could also be performed therewith. The properties of a variable-focus lens 31, such as, for example, a liquid lens, may also be dependent, for example, on the installation position or an applied external acceleration (e.g., as a double time derivative of the position, or also by means of an acceleration sensor), because the acceleration can cause so-called coma error. This dependency is generally known, for example, by measurement or by manufacturer specification, and can therefore be stored, read out, and taken into consideration as lens data. Analogously to the temperature-dependent corrections, there may also be position- or acceleration-dependent corrections performed in the objective module 3 or in the camera module 2 by control of the optical system or through software in the image processing unit 22.

The position sensor 39 may also be read out from the camera module 2 via the near field communication unit 35, and the camera module 2 may use the delivered sensor values to control the camera 1 or output same via the interface 23. The reading out from the position sensor 39 may take place directly via the near field communication unit 35 (such as in FIG. 2), or also indirectly via the objective control unit 32.

In addition to temperature and position/acceleration, still other physical quantities in the environment of the objective module may also be detected, as a matter of course, such as, for example, the relative humidity in the surroundings, because the optical system or a part thereof may also change in accordance therewith. Such a physical quantity could then, in turn, be used to control a function of the objective module 3 and/or the camera module 2, or to correct a dependency of the optical properties of the objective module 3 on this physical quantity.

A distance sensor 45 that measures the distance of the objective module 3 from a reference plane may also be provided in the objective module 3. Together with the position sensor 39, the relative position of the objective module 3 in space relative to a reference plane can be checked (for example, in the camera module 2, or in a machine or installation control device connected thereto), which can be used, for example, to adjust a machine vision system. The distance sensor 45 may also be used to control the image capture and/or illumination of the industrial image processing.

The distance sensor 45 may also be read out from the camera module 2 via the near field communication unit 35, and the camera module 2 may use the delivered sensor values to control the camera 1. The reading out of the distance sensor 45 may take place directly via the near field communication unit 35, or also indirectly via the objective control unit 32 (such as in FIG. 2).

The sensor 38 and/or the position sensor 39 and/or the distance sensor 45 could also, or additionally, be installed in the camera module 2, wherein the sensor values can then be read out, for example, directly from the camera control unit 24 or the image processing unit 22. The sensor 38 and/or the position sensor 39 and/or the distance sensor 45 could also, or additionally, be installed on other suitable places that are, however, uniquely associated with the objective module 3, for example, on an illumination unit fixedly installed on the camera 1. Reading out from sensors installed in this manner can be performed, for example, again by means of near field communication, or via a fixed wiring.

With very small objective modules 3, for example, in the case of an S-mount, the available installation size may, in certain circumstances, not suffice to arrange the elements required for the near field communication directly on the objective module 3. In particular in this case, a transponder inlay may be used on the objective module 3. There may also be provided an expansion ring 40, such as is depicted in FIG.

Figure 2:
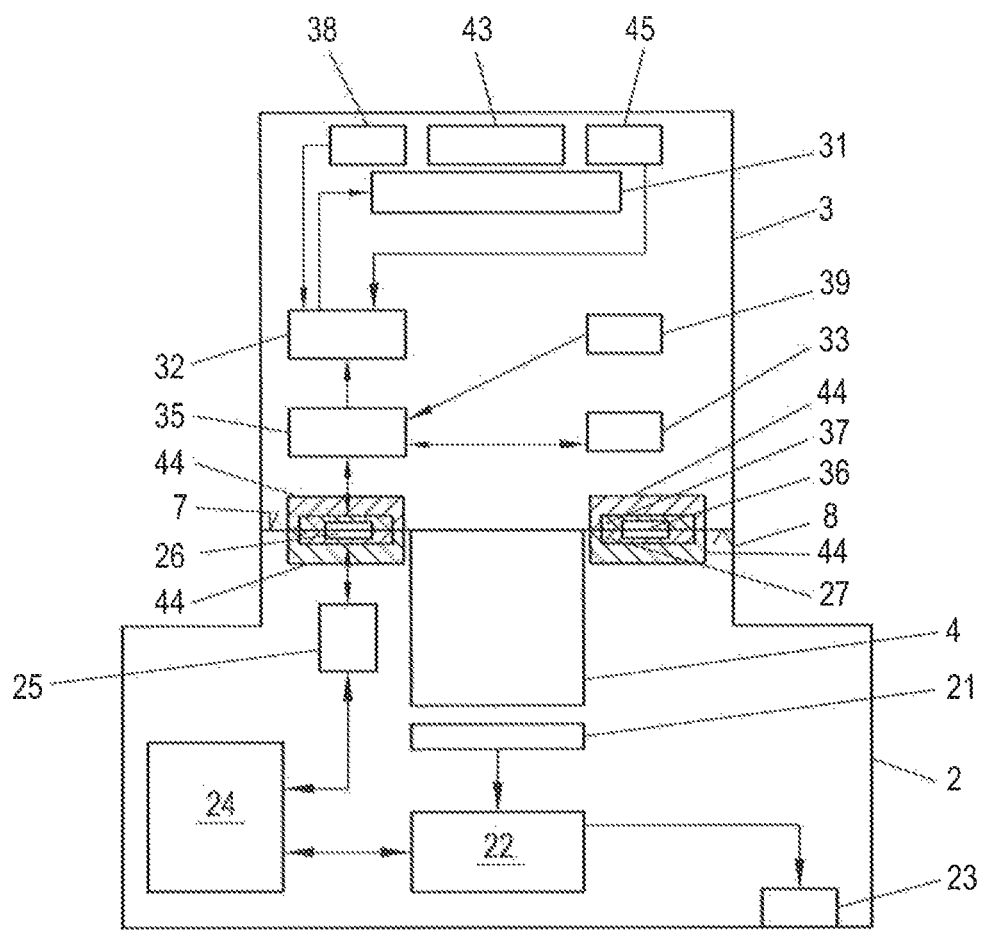
FIG. 2 illustrates components of the camera module and objective module.
Figure 3:
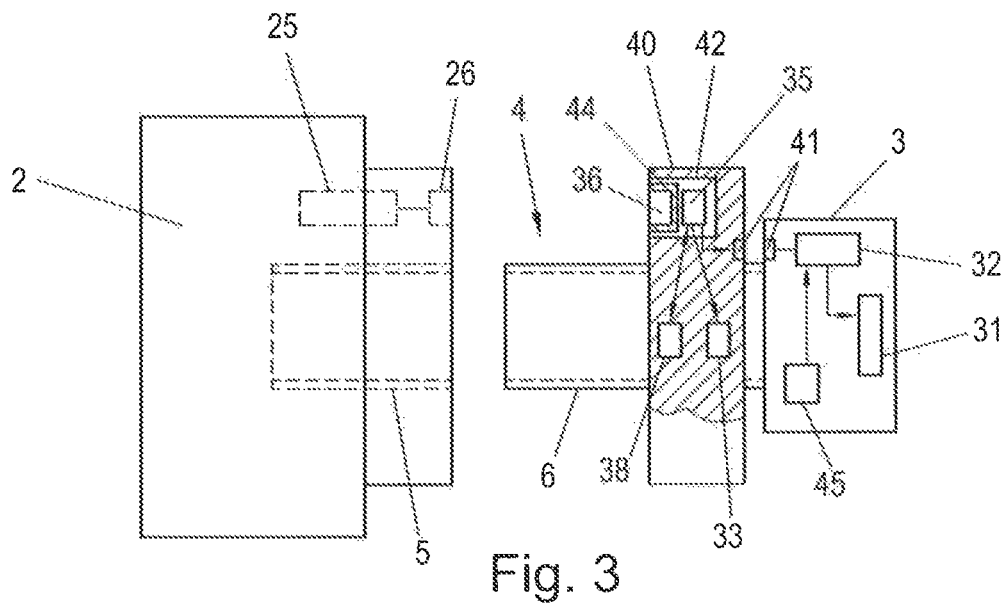
FIG. 3 illustrates a possible configuration of the connection between the camera module and objective module.

3, that is threaded onto the thread 6 of the mount 4 of the objective module 3. The antenna arrangement 36 and the associated near field communication unit 35 of the objective module 3, for example configured as the transponder inlay 42, as in FIG. 3, may be arranged on the expansion ring 40. There could also be provided antenna arrangements 26, 36 that are arranged on annular printed circuit boards 27, 37 and are respectively arranged on end surfaces on the camera module 2 and objective module 3 that face one another and abut against one another, such as is depicted in FIG. 2. If sufficient energy, for example for controlling actuators, can be made available, for example, through the large-area connection of the annular arrangement, then the connection to the objective control unit 32 and, subsequently, to the variable-focus lens 31 and to a sensor 38, or also to a position sensor 39 or distance sensor 45, can already be implemented at the manufacture of the objective module 3, via a suitable interacting electrical connection 41 on the objective module 3 and on the expansion ring 40. The electrical connection 41 could then also be implemented as a permanent connection. The expansion ring 40 and the objective module 3 may then be threaded together into the camera module 2. Still no electrical contacts in the form of plug-in connections are required at all between the camera module 2 and the objective module 3 (with the expansion ring 40).

The storage unit 33 of the objective module 3 or of the expansion ring 40 may, however, also store operating data that would be interesting for servicing. Thus, for example, data on the maximum ambient temperature, shock, or vibration, or the operational duration, which may be obtained, for example, from the built-in sensors in the objective module 3, is valuable information. Such operational data may be read out from or written to the storage unit 33 of the objective module 3 by the objective module 3, either independently, for example via the objective control unit 32, or via the camera module 2 and the near field communication unit 35, and may be outputted, for example, from the camera module 2 to a display, or can be read out via the interface 23.

What is claimed:

1. A camera for industrial image processing, comprising:
    a camera module comprising an image sensor for capturing an image and
    an objective module, which is releasably connectable to the camera module, having an optical system with at least one optical lens and having lens data storage,
    wherein, each of the camera module and the objective module includes a wireless near field communication unit configured to interact with each other,
    wherein the camera module further comprises a camera module abutment surface and the objective module further comprises an objective module abutment surface that is positionable to face the camera module abutment surface,
    wherein an antenna arrangement of the objective module wireless near field communication unit is arranged on the objective module abutment surface and an antenna arrangement of the camera module wireless near field communication unit is arranged on the camera module abutment surface,
    wherein the objective module wireless near field communication unit is configured to convert an electromagnetic alternating field received by the antenna arrangement of the objective module wireless near field communication unit and emitted from the antenna arrangement of the camera module wireless near field communication unit into electrical energy for supplying energy to the objective module, and
    wherein lens data from the lens data storage is read in the camera module via the objective module wireless near field communication unit and the camera module wireless near field communication unit to control a function of at least one of the camera module or the objective module.

2. The camera according to claim 1, wherein the camera module sends control data for controlling the objective module to the objective module via the interacting camera module and objective module wireless near field communication units.

3. The camera according to claim 1, wherein the objective module further comprises a variable-focus optical lens, and
    wherein the objective module wireless near field communication unit converts the electromagnetic alternating field emitted from the camera module wireless near field communication unit into the electrical energy for adjustment of the variable-focus optical lens.

4. The camera according to claim 3, wherein the variable-focus optical lens is a liquid lens.

5. The camera according to claim 1, wherein the objective module further comprises an adjustable aperture, and
    wherein the objective module wireless near field communication unit converts the electromagnetic alternating field emitted from the camera module wireless near field communication unit into the electrical energy for adjustment of the adjustable aperture.

6. The camera according to claim 1, wherein the objective module receives control commands from the camera module via interacting camera module wireless near field communication unit and objective module wireless near field communication unit.

7. The camera according to claim 1, wherein at least one of:
    the objective module abutment surface comprises a depression, and the objective module antenna arrangement is arranged in the depression of the objective module abutment surface or
    the camera module abutment surface comprises a depression, and the camera module antenna arrangement is arranged in the depression of the camera module abutment surface.

8. The camera according to claim 1, wherein the camera module and the objective module are releasably connectable to one another via a standardized C-mount, CS-mount, or S-mount connection.

9. The camera according to claim 1, wherein at least one of the camera module and the objective module further comprises at least one sensor configured to detect a physical quantity in an environment of the camera.

10. The camera according to claim 9, wherein the objective module wireless near field communication unit converts the electromagnetic alternating field emitted from the camera module wireless near field communication unit into the electrical energy for operating and reading out data from the at least one sensor.

11. The camera according to claim 9, wherein the at least one sensor comprises a temperature sensor.

12. The camera according to claim 11, wherein correction data for correcting a temperature dependency of the optical system of the objective module is stored in the lens data storage.

13. The camera according to claim 12, wherein correction of the temperature dependency is implementable in one of the objective module or the camera module.

14. The camera according to claim 9, wherein the at least one sensor comprises at least one of a position sensor or a distance sensor.

15. The camera according to claim 14, wherein correction data for correcting at least one of position dependency, acceleration dependency or distance dependency of the optical system of the objective module is stored in the lens data storage.

16. The camera according to claim 15, wherein correction of the at least one of the position dependency, the acceleration dependency or the distance dependency is implementable in one of the objective module or the camera module.

17. The camera according to claim 1, wherein data for uniquely identifying the objective module is stored in the lens data storage.

18. The camera according to claim 1, wherein data on the optical system of the objective module is stored in the lens data storage.

19. The camera according to claim 1, wherein calibration data on the objective module is stored in the lens data storage.

20. A method for operating a camera for industrial image processing, the camera comprising a camera module and an objective module, which is releasably connectable to the camera module, having an optical system with at least one optical lens, each of the camera module and the objective module having a near field communication unit, the method comprising:
reading, in the camera module, lens data from a lens data storage in the objective module via interaction between the near field communication units in the objective module and in the camera module; and
using the lens data to capture an image with the camera,
wherein the camera module further comprises a camera module abutment surface and the objective module further comprises an objective module abutment surface that is positionable to face the camera module abutment surface,
wherein an antenna arrangement of the objective module wireless near field communication unit is arranged on the objective module abutment surface and an antenna arrangement of the camera module wireless near field communication unit is arranged on the camera module abutment surface, and
wherein electrical energy supplied to the objective module is obtained by the antenna arrangement of the objective module wireless near field communication unit from an electromagnetic alternating field emitted from the antenna arrangement of the camera module near field communication unit.

21. The method according to claim 20, further comprising sending, from the camera module, control data for controlling the objective module to the objective module via the camera module near field communication unit and objective module near field communication unit.

22. The method according to claim 20, wherein the objective module comprises at least one of a variable focus optical lens or an adjustable aperture, and the method further comprises receiving electrical energy for the at least one of the variable-focus optical lens or the adjustable aperture from the electromagnetic alternating field emitted from the camera module near field communication unit.

23. The method according to claim 20, further comprising detecting a physical quantity in a vicinity of the objective module with a sensor in the objective module, and controlling a function of at least one of the objective module or of the camera module based on the detected physical quantity.

24. The method according to claim 20, further comprising detecting a physical quantity in a vicinity of the objective module with a sensor, and correcting a dependency of optical properties of the objective module based on the detected physical quantity.

25. The method according to claim 24, wherein correction data for correcting the dependency is stored in the lens data storage.

26. The method according to claim 23, further comprising supplying electrical energy to the sensor from the electromagnetic alternating field emitted from the camera module near field communication unit.

27. The method according to claim 20, wherein data for uniquely identifying the objective module is stored in the lens data storage.

28. The method according to claim 20, wherein data on the optical system of the objective module is stored in the lens data storage.

29. The method according to claim 20, wherein calibration data of the objective module is stored in the lens data storage.

30. The camera according to claim 1, wherein the camera module comprises a controller.

31. The camera according to claim 6, wherein the objective module comprises an objective controller connected to the objective module wireless near field communication unit.

32. The camera according to claim 30, wherein at least one of the camera module or the objective module is controllable by the controller.

* * * * *